United States Patent
Sienel et al.

(10) Patent No.: US 7,203,650 B2
(45) Date of Patent: Apr. 10, 2007

(54) TELECOMMUNICATION SYSTEM, SPEECH RECOGNIZER, AND TERMINAL, AND METHOD FOR ADJUSTING CAPACITY FOR VOCAL COMMANDING

(75) Inventors: Jürgen Sienel, Leonberg (DE); Dieter Kopp, Illingen (DE); Ulf Knoblich, Birkenfeld (DE)

(73) Assignee: Alcatel, Paris (FR)

( * ) Notice: Subject to any disclaimer, the term of this patent is extended or adjusted under 35 U.S.C. 154(b) by 707 days.

(21) Appl. No.: 10/069,612

(22) PCT Filed: May 7, 2001

(86) PCT No.: PCT/EP01/05131

§ 371 (c)(1),
(2), (4) Date: Feb. 27, 2002

(87) PCT Pub. No.: WO02/03379

PCT Pub. Date: Jan. 10, 2002

(65) Prior Publication Data
US 2002/0138277 A1    Sep. 26, 2002

(30) Foreign Application Priority Data
Jun. 30, 2000   (EP) ................................ 00440197

(51) Int. Cl.
*G10L 21/00* (2006.01)
(52) U.S. Cl. .................. 704/270; 221/235; 221/270.1; 221/275
(58) Field of Classification Search ................ 704/221, 704/270, 270.1–175, 231–257; 370/354, 370/338; 379/197
See application file for complete search history.

(56) References Cited

U.S. PATENT DOCUMENTS

| | | | |
|---|---|---|---|
| 4,757,525 A * | 7/1988 | Matthews et al. | 379/197 |
| 5,809,464 A | 9/1998 | Kopp et al. | |
| 5,915,236 A | 6/1999 | Gould et al. | |
| 6,336,090 B1 * | 1/2002 | Chou et al. | 704/221 |
| 6,363,079 B1 * | 3/2002 | Barzegar et al. | 370/254 |
| 6,404,761 B1 * | 6/2002 | Snelling et al. | 370/338 |

OTHER PUBLICATIONS

V. V. Digalakis et al, "Quantization of Cepstral Parameters for Speech Recognition over the Word Wide Web", IEEE Journal on Selected Area in Communications, US, IEEE Inc. New York, vol. 17, No. 1, Jan. 1999, pp. 82-90, XP000800684.
E. Paksoy et al, "An Adaptive Multi-Rate Speech Coder for Digital Cellular Telephony"Phony, Phoenix, AZ, Mar. 15-19, 1999, New York, NY IEEE, US pp. 193-196, XP000898292.

* cited by examiner

*Primary Examiner*—Richemond Dorvil
*Assistant Examiner*—Qi Han
(74) *Attorney, Agent, or Firm*—Sughrue Mion, PLLC

(57) ABSTRACT

In telecommunication systems including a terminal and a speech recognizer for vocal commanding, an indication signal originating from the terminal is detected, e.g., a telephone number dialed or a key signal or a vocal signal, or originating from an application located in the terminal or elsewhere in the network and in dependence of the indication signal a capacity parameter for the vocal commanding is adjusted, whereby a flexible capacity parameter is created for adjusting the available bandwidth between terminal and speech recognizer and/or for adjusting a processor capacity of terminal and/or speech recognizer, e.g., a sampling rate or a noise reduction being deactivated, as a result of which name dialing, command and control, and dictation can be done with the highest efficiency.

14 Claims, 1 Drawing Sheet

TELECOMMUNICATION SYSTEM, SPEECH RECOGNIZER, AND TERMINAL, AND METHOD FOR ADJUSTING CAPACITY FOR VOCAL COMMANDING

BACKGROUND OF THE INVENTION

The invention relates to a telecommunication system comprising a terminal coupled to a network comprising a speech recognizer for vocal commanding.

Such a telecommunication system is known in the form of a telecommunication network for fixed and/or mobile communication, with said terminal being a fixed (PSTN, ISDN etc.) terminal (telephone, screenphone, pc etc.) or a wireless (cordless: DECT etc.) or a mobile (GSM, UMTS etc.) terminal (wireless handset etc.), and with said speech recognizer for vocal commanding being of common general knowledge and available on the market and being based upon a fixed capacity (with said vocal commanding taking place via a fixed bandwidth between source and destination and/or at a fixed sampling rate at source and/or destination—and/or with noise reduction being always switched on or off—and/or with a processor speed or available processing time at source and/or destination being fixed).

Such a telecommunication system is disadvantageous, inter alia, due to being inefficient.

BRIEF SUMMARY OF THE INVENTION

It is an object of the invention, inter alia, to provide a telecommunication system as described in the preamble, which is more efficient.

Thereto, the telecommunication system according to the invention is characterized in that said telecommunication system comprises a detector for detecting an indication signal and comprises an adjustor for in dependence of said indication signal adjusting a capacity parameter for said vocal commanding.

By introducing said detector and said adjustor, a flexible capacity parameter is created, which allows a flexible bandwidth between terminal and speech recognizer—and/or a variable sampling rate at terminal and/or speech recognizer—and/or a noise reduction being switched on/off in dependence of for example a signal quality—and/or with a processor speed or available processing time in terminal and/or speech recognizer being flexible. Said indication signal for example originates from said terminal and is for example in the form of a telephone number or a key signal or a vocal signal generated by a user or is for example in the form of an application signal originating from (a part of) an application running in said terminal. Or said indication signal for example originates from said network and is for example in the form of a further application signal originating from (a part of) an application running in said network.

The invention is based on the insight, inter alia, that the kind of vocal commanding is of influence to the necessary capacity (name dialling, command & control, dictation etc.).

The invention solves the problem, inter alia, of increasing the efficiency of the telecommunication system.

A first embodiment of the telecommunication system according to the invention is characterized in that said adjustor in dependence of a network signal further adjusts said capacity parameter.

By making said adjustor not just dependent upon said indication signal but also dependent upon said network signal, the availability is taken into account when adjusting said capacity parameter, thereby avoiding that said system asks for more capacity than available and/or allowing said system getting more capacity than necessary in case of said capacity being available superfluously.

A second embodiment of the telecommunication system according to the invention is characterized in that said terminal comprises a preprocessing unit for preprocessing signals, with said network comprising a final processing unit for final processing said preprocessed signals.

By introducing distributed speech recognition, the efficiency of the system is further increased.

The invention further relates to a speech recognizer for use in a telecommunication system comprising a terminal coupled to a network comprising said speech recognizer for vocal commanding.

The speech recognizer according to the invention is characterized in that said telecommunication system comprises a detector for detecting an indication signal, with said speech recognizer comprising an adjustor for in dependence of said indication signal adjusting a capacity parameter for said vocal commanding.

A first embodiment of the speech recognizer according to the invention is characterized in that said adjustor in dependence of a network signal further adjusts said capacity parameter.

A second embodiment of the speech recognizer according to the invention is characterized in that said terminal comprises a preprocessing unit for preprocessing signals, with said speech recognizer comprising a final processing unit for final processing said preprocessed signals.

The invention also relates to a terminal for use in a telecommunication system comprising said terminal coupled to a network comprising a speech recognizer for vocal commanding.

The terminal according to the invention is characterized in that said telecommunication system comprises a detector for defecting an indication signal and comprises an adjustor for in dependence of said indication signal adjusting a capacity parameter for said vocal commanding.

A first embodiment of the terminal according to the invention is characterized in that said terminal comprises a man-machine-interface for receiving said indication signal.

A second embodiment of the terminal according to the invention is characterized in that said terminal comprises a preprocessing unit for preprocessing signals, with said network comprising a final processing unit for final processing said preprocessed signals.

The invention yet also relates to a method for use in a telecommunication system comprising a terminal coupled to a network comprising a speech recognizer for vocal commanding.

The method according to the invention is characterized in that said method comprises a first step of detecting an indication signal and a second step of in dependence of said indication signal adjusting a capacity parameter for said vocal commanding.

Embodiments of the method according to the invention are in correspondence with embodiments of the telecommunication system according to the invention.

The document U.S. Pat. No. 5,809,464 discloses a dictating mechanism based upon distributed speech recognition (DSR). Other documents being related to DSR are for example EP00440016.4 (corresponding to U.S. patent application filed Jan. 17, 2001) and EP00440057.8 (corresponding to U.S. patent application Ser. No. 09/789,808 filed Feb. 22, 2001).

The document EP00440087.5 (corresponding to U.S. patent application Ser. No. 09/791,562 filed Feb. 26, 2001)

discloses a system for performing vocal commanding. Neither one of these documents discloses the telecommunication system according to the invention. All references including further references cited with respect to and/or inside said references are considered to be incorporated in this patent application

BRIEF DESCRIPTION OF THE DRAWINGS

The invention will be further explained at the hand of an embodiment described with respect to a drawing, whereby FIG. 1 discloses a telecommunication system according to the invention comprising a speech recognizer according to the invention and a terminal according to the invention mutually coupled via a switch.

DETAILED DESCRIPTION OF THE INVENTION

Figure 1:
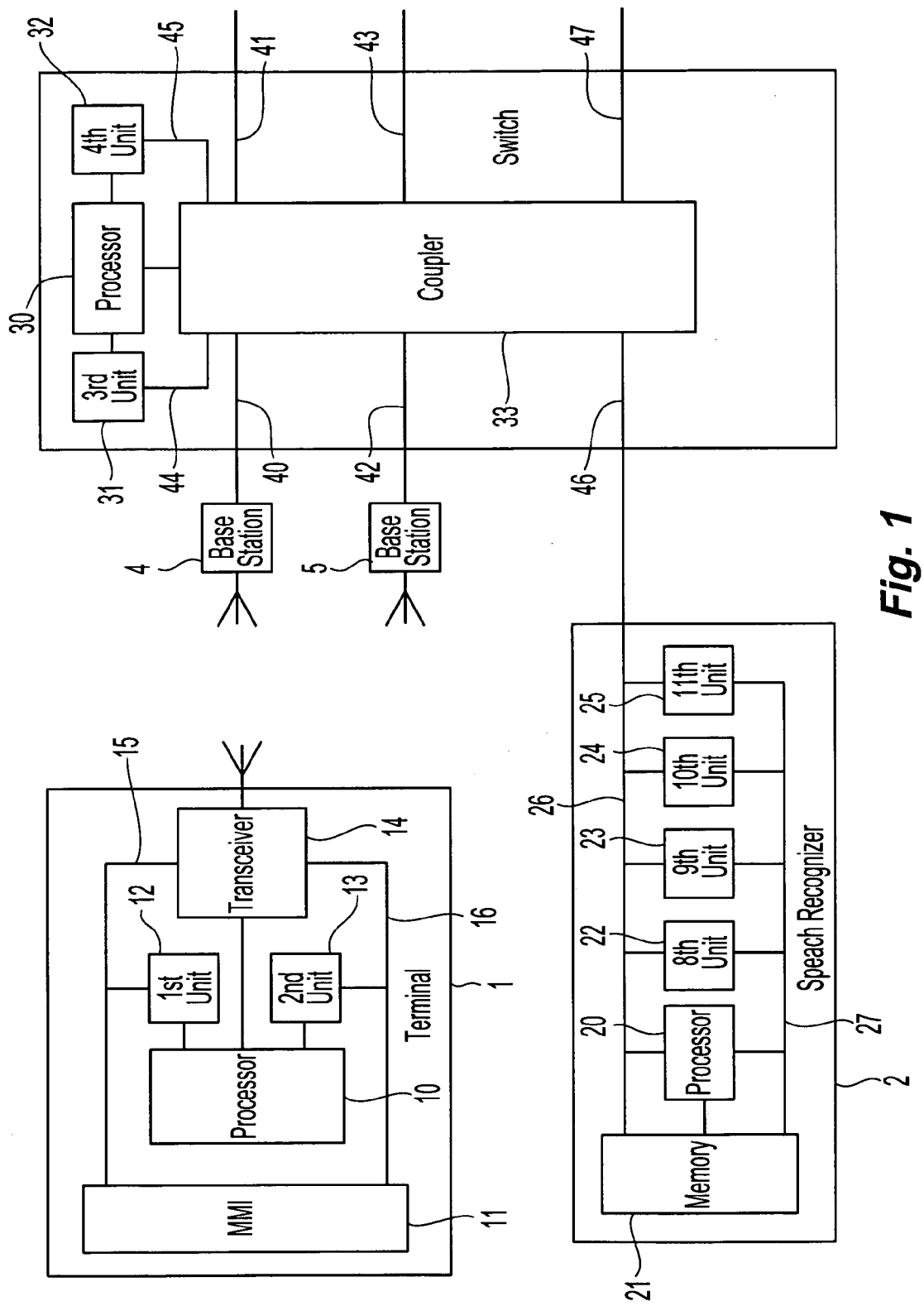

Terminal 1 according to the invention as shown in FIG. 1 comprises a processor 10 (comprising a memory not shown), a man-machine-interface 11 (mmi 11 like a display, keyboard, microphone, loudspeaker, etc.), a first unit 12, a second unit 13 and a transceiver 14. One side of transceiver 14 is coupled to an antennae and of an other side an output of transceiver 14 is coupled via a connection 15 to mmi 11 and unit 12 and an input of transceiver 14 is coupled via a connection 16 to mmi 11 and to unit 13 and a control in/output is coupled via a control connection to processor 10. Processor 10 is further coupled via further control connections to mmi 11, unit 12 and unit 13.

Switch 3 as shown in FIG. 1 comprises a processor 30, a third unit 31, a fourth unit 32, a fifth unit 34, a sixth unit 35 and a seventh unit 36. Processor 30 is coupled via control connections to unit 31, to unit 32 and to coupler 33. Coupler 33 is coupled via a connection 40 to a base station 4 for mobile communication with terminal 1 and via a connection 42 to a base station 5 and via a connection 44 to unit 31 and via a connection 45 to unit 32 and via a connection 46 to speech recognizer 2 and via a connection 48 to unit 34 and via a connection 50 to unit 35 and via a connection 49 to unit 36.

Speech recognizer 2 according to the invention as shown in FIG. 1 comprises a processor 20, a memory 21, an eighth unit 22, a nineth unit 23, a tenth unit 24 and an eleventh unit 25. Processor 20 is coupled via a control bus 27 to memory 21, to unit 22, to unit 23, to unit 24 and to unit 25, and is coupled via a control connection to memory 21, and is coupled via a bus 26 to memory 21, to unit 22, to unit 23, to unit 24 and to unit 25. Bus 26 is coupled to connection 46.

The telecommunication system according to the invention as shown in FIG. 1 functions as follows.

According to a first embodiment, a user of terminal 1 wants to perform vocal commanding, like firstly name dialling. Thereto, said user dials a first telephone number, for example by pressing keys of the keyboard of mmi 11, in response to which, under control of processor 10, a first signalling signal is sent via connection 16 and transceiver 14 and base station 4 and connection 40 to coupler 33 of switch 3. Under control of processor 30, said first signalling signal is supplied via connection 44 to unit 31 for example being a detector for detecting an indication signal like said first signalling signal, which detector 31 detects said first signalling signal and informs processor 30 that said user wants to perform name dialling via terminal 1. In response, processor 30 sends a first information signal to speech recognizer 2 via coupler 33 and connection 46 for informing speech recognizer 2 that said user wants to perform name dialling via terminal 1. This first information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said first information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a first capacity parameter having a first value (for example sampling rate 8000, bandwidth 4.8 kbps, noise reduction: no, complexity 5 wMops, purpose: name dialling) is sent back to switch 3 and/or terminal 1. In response to this first capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or deactivates noise reduction, for example. As a result, said user can now perform name dialling, by entering speech via the microphone of mmi 11, which via switch 3 is supplied to speech recognizer 2 for recognizing said speech, in response to which a name is recognized and a corresponding destination number stored in memory 21 is sent to switch 3. As a result, a speech connection is created from terminal 1 via switch 3 to a destination defined by said destination number, etc.

Then, said user of terminal 1 wants to perform vocal commanding, like secondly control & command (for controlling and/or commanding for example certain services available in the network). Thereto, said user dials a second telephone number (different from said first telephone number), for example by pressing keys of the keyboard of mmi 11, in response to which, under control of processor 10, a second signalling signal (different from said first signalling signal) is sent via connection 16 and transceiver 14 and base station 4 and connection 40 to coupler 33 of switch 3. Under control of processor 30, said second signalling signal is supplied via connection 44 to unit 31 for example being a detector for detecting an indication signal like said second signalling signal, which detector 31 detects said second signalling signal and informs processor 30 that said user wants to perform command & control via terminal 1 In response, processor 30 sends a second information signal to speech recognizer 2 via coupler 33 and connection 46 for informing speech recognizer 2 that said user wants to perform command & control via terminal 1. This second information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said second information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a second capacity parameter having a second value (for example sampling rate 11000, bandwidth 5.0 kbps, noise reduction: no, complexity 10 wMops, purpose: command & control) is sent back to switch 3 and/or terminal 1. In response to this second capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or deactivates noise reduction, for example. As a result, said user can now perform command & control, by entering speech via the microphone of mmi 11, which via switch 3 is supplied to speech recognizer 2 for recognizing said speech, in response to which commands and/or controls are recognized and a corresponding command and/or control is performed, etc.

Then, said user of terminal 1 wants to perform vocal commanding, like thirdly dictation (for dictating for example a text to be stored/processed in the network). Thereto, said user dials a third telephone number (different from said first/second telephone number), for example by pressing keys of the keyboard of mmi 11, in response to which, under control of processor 10, a third signalling signal (different from said first/second signalling signal) is sent via connection 16 and transceiver 14 and base station 4 and connection 40 to coupler 33 of switch 3. Under control of processor 30, said third signalling signal is supplied via connection 44 to unit 31 for example being a detector for detecting an indication signal like said third signalling signal, which detector 31 detects said third signalling signal and informs processor 30 that said user wants to perform dictation via terminal 1. In response, processor 30 sends a third information signal to speech recognizer 2 via coupler 33 and connection 46 for informing speech recognizer 2 that said user wants to perform dictation via terminal 1. This third information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said third information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a third capacity parameter having a third value (for example sampling rate 16000, bandwidth 5.0 kbps, noise reduction: no, complexity 12 wMops, purpose: dictation) is sent back to switch 3 and/or terminal 1. In response to this third capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or deactivates noise reduction, for example. As a result, said user can now perform dictation, by entering speech via the microphone of mmi 11, which via switch 3 is supplied to speech recognizer 2 for recognizing said speech, in response to which dictation takes place and text for example in memory 21 is stored/processed, etc.

According to a first alternative to said first embodiment, for example in case of said user wanting to perform vocal commanding like command & control and/or dictation, said switch 3 and/or said terminal 1 respectively may, in response to receiving (a part of) a second or third capacity parameter having said second or third value, compare (said part of) said capacity parameter with a predefined (part of a) capacity parameter (by for example using a detector—like detector 31 in switch 3 and unit 12 in terminal 1—and/or a comparator—like unit 32 in switch 3 and unit 12 in terminal 1-), and decide that at the moment the necessary capacity is not available, in response to which (said part of) said capacity parameter must be replaced by (a part of) said first capacity parameter, and a warning signal is to be sent to speech recognizer 2 and/or terminal 1 and switch 3 respectively (by for example using a warning signal generator). Such a warning signal can, at terminal 1, for example be shown at the display of mmi 11 or be generated via the loudspeaker of mmi 11.

According to a second alternative to said first embodiment, terminal 1 comprises a preprocessing unit (for example unit 13 or a part of processor 10) for preprocessing voice signals generated via mmi 11 (microphone), in which case in speech recognizer 2 a final processing function (for example unit 24) for final processing said preprocessed voice signal, in which case a distributed speech recognition system has been created.

According to a third alternative to said first embodiment, terminal 1 comprises a small vocal commanding unit like for example a simple name dialler (for example unit 13 or a part of processor 10), and instead of dialling said first, second and/or third telephone numbers, said user can enter said numbers through voice and the microphone of mmi 11.

According to a second embodiment, said user of terminal 1 wants to perform vocal commanding, like firstly name dialling or secondly command & control or thirdly dictation. Thereto, for each possibility, said user dials one telephone number, for example by pressing keys of the keyboard of mmi 11, and then enters a key signal (like a first key for name dialling, a second key for command & control and a third key for dictation) in response to which, under control of processor 10, a signalling signal is sent via connection 16 and transceiver 14 and base station 4 and connection 40 to coupler 33 of switch 3. Under control of processor 30, said signalling signal is supplied via connection 44 to unit 31 for example being a detector for detecting an indication signal like said signalling signal, which detector 31 detects said signalling signal and informs processor 30 that said user wants to perform name dialling (first key used) or command & control (second key used) or dictation (third key used) via terminal 1. In response, processor 30 sends an information signal to speech recognizer 2 via coupler 33 and connection 46 for informing speech recognizer 2 that said user wants to perform name dialling/command & control/dictation via terminal 1. This information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a first/second/third capacity parameter having a first/second/third value is sent back to switch 3 and/or terminal 1. In response to this capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or deactivates noise reduction, for example. As a result, said user can now perform name dialling/command & control/dictation etc.

According to a first alternative to said second embodiment, for example in case of said user wanting to perform vocal commanding like command & control and/or dictation, said switch 3 and/or said terminal 1 respectively may, in response to receiving (a part of) a second or third capacity parameter having said second or third value, compare (said part of) said capacity parameter with a predefined (part of a) capacity parameter (by for example using a detector—like detector 31 in switch 3 and unit 12 in terminal 1—and/or a comparator—like unit 32 in switch 3 and unit 12 in terminal 1-), and decide that at the moment the necessary capacity is not available, in response to which (said part of) said capacity parameter must be replaced by (a part of) said first capacity parameter, and a warning signal is to be sent to speech recognizer 2 and/or terminal 1 and switch 3 respectively (by for example using a warning signal generator). Such a warning signal can, at terminal 1, for example be shown at the display of mmi 11 or be generated via the loudspeaker of mmi 11.

According to a second alternative to said second embodiment, terminal 1 comprises a preprocessing unit (for example unit 13 or a part of processor 10) for preprocessing voice signals generated via mmi 11 (microphone), in which case in speech recognizer 2 a final processing function (for example unit 24) for final processing said preprocessed voice signal, in which case a distributed speech recognition system has been created.

According to a third alternative to said second embodiment, terminal 1 comprises a small vocal commanding unit like for example a simple name dialler (for example unit 13 or a part of processor 10), and instead of dialling said one telephone number, said user can enter said number through voice and the microphone of mmi 11.

According to a fourth alternative to said second embodiment, terminal 1 comprises a small vocal commanding unit like for example a simple name dialler (for example unit 13 or a part of processor 10), and instead of entering said key signals, said user can enter them through voice and the microphone of mmi 11.

According to a third embodiment, said user of terminal 1 wants to perform vocal commanding, like firstly name dialling or secondly command & control or thirdly dictation. Thereto, for each possibility, said user dials one telephone number, for example by pressing keys of the keyboard of mmi 11, in response to which, under control of processor 10, a signalling signal is sent via connection 16 and transceiver 14 and base station 4 and connection 40 to coupler 33 of switch 3. Under control of processor 30, said signalling signal is supplied via connection 44 to unit 31 for example being a detector for detecting an indication signal like said signalling signal, which detector 31 detects said signalling signal and informs processor 30 that said user wants to perform vocal commanding via terminal 1. In response, processor 30 sends an information signal to speech recognizer 2 via coupler 33 and connection 46 for informing speech recognizer 2 that said user wants to perform vocal commanding via terminal 1. This information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a general capacity parameter having a general value is sent back to switch 3 and/or terminal 1. In response to this capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or deactivates noise reduction, for example. As a result, said user can now perform vocal commanding, and during this vocal commanding said user starts a dialogue with speech recognizer 2 for having said capacity parameter adjusted etc.

According to a first alternative to said third embodiment, for example in case of said user wanting to perform or is performing vocal commanding like command & control and/or dictation, said switch 3 and/or said terminal 1 respectively may decide that at the moment the necessary capacity is not available, in response to which said warning signal is to be sent to speech recognizer 2 and/or terminal 1 and switch 3 respectively etc.

According to a second alternative to said third embodiment, terminal 1 comprises a preprocessing unit (for example unit 13 or a part of processor 10) for preprocessing voice signals generated via mmi 11 (microphone), in which case in speech recognizer 2 a final processing function (for example unit 24) for final processing said preprocessed voice signal, in which case a distributed speech recognition system has been created.

According to a third alternative to said third embodiment, terminal 1 comprises a small vocal commanding unit like for example a simple name dialler (for example unit 13 or a part of processor 10), and instead of dialling said one telephone number, said user can enter said number through voice and the microphone of mmi 11.

According to a fourth alternative to said third embodiment, terminal 1 comprises a small vocal commanding unit like for example a simple name dialler (for example unit 13 or a part of processor 10), and at least a part of said dialogue takes place under control of and/or by using this small vocal commanding unit, etc.

According to a fourth embodiment, a connection between terminal 1 and speech recognizer 2 via switch 3 is already there, and an application is running in processor 10 in terminal 1 or partly in processor 20 in speech recognizer 2 and partly in processor 10. Then, said (part of an) application in said terminal decides that vocal commanding should be offered to said user and/or that the kind of vocal commanding should be changed. Thereto, from terminal 1 (via an indication signal generator not shown and for example forming part of processor 10) an indication signal is sent to coupler 33 of switch 3. Under control of processor 30, said indication signal is supplied via connection 44 to unit 31 for example being a detector for detecting said indication signal, which detector 31 informs processor 30 that said (part of an) application wants to offer and/or to change said vocal commanding, etc. In response, processor 30 sends an information signal to speech recognizer 2 via coupler 33 and connection 46 for informing speech recognizer 2 that said (part of on) application in said terminal 1 user wants to offer/change vocal commanding via terminal 1. This information signal either comprises for example a user identification and/or a terminal identification (direct addressing) or comprises an address code which in switch 3 is related to said user identification and/or terminal identification (indirect addressing) In speech recognizer 2, unit 22 for example being a detector detects said information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a specific capacity parameter having a specific value is sent back to switch 3 and/or terminal 1. In response to this capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or (de)activates noise reduction, for example. As a result, vocal commanding is offered and/or changed etc.

According to a first alternative to said fourth embodiment, for example in case of said application wanting to offer vocal commanding like command & control and/or dictation, said switch 3 and/or said terminal 1 respectively may decide that at the moment the necessary capacity is not available, in response to which said warning signal is to be sent to speech recognizer 2 and/or terminal 1 and switch 3 respectively etc.

According to a second alternative to said fourth embodiment, terminal 1 comprises a preprocessing unit (for example unit 13 or a part of processor 10) for preprocessing voice signals generated via mmi 11 (microphone), in which case in speech recognizer 2 a final processing function (for example unit 24) for final processing said preprocessed voice signal, in which case a distributed speech recognition system has been created.

According to a third alternative to said fourth embodiment, terminal 1 comprises a small vocal commanding unit like for example a simple name dialler (for example unit 13 or a part of processor 10), and at least a part of a dialogue takes place under control of and/or by using this small vocal commanding unit, etc.

According to a fifth embodiment, a connection between terminal 1 and speech recognizer 2 via switch 3 is already there, and an application is running in processor 20 in speech recognizer 2 or partly in processor 20 and partly in processor 10 in terminal 1. Then, said (part of an) application in said speech recognizer 2 decides that vocal commanding should be offered to said user and/or that the kind of vocal commanding should be changed. Thereto, from speech recognizer 2 (for example via unit 25 being an indication signal generator) an indication signal is sent to coupler 33 of switch 3. Under control of processor 30, said indication signal is supplied via connection 44 to unit 31 for example being a detector for detecting said indication signal, which detector 31 informs processor 30 that said (part of an) application wants to offer and/or to change said vocal commanding, etc. In response, processor 30 sends an information signal to speech recognizer 2 via coupler 33 and connection 46 for informing speech recognizer 2 that said (part of an) application in said terminal 1 user wants to offer/change vocal commanding via terminal 1. This information signal either comprises for example a user identification and/or a terminal identification (direct addressing) or comprises an address code which in switch 3 is related to said user identification and/or terminal identification (indirect addressing). In speech recognizer 2, unit 22 for example being a detector detects said information signal as arrived via connection 46 and bus 26 under control of processor 20 via control bus 27 and informs processor 20 via control bus 27 of said detection. In response, processor 20 controls unit 23 for example being an adjustor via control bus 27 in such a way that a specific capacity parameter having a specific value is sent back to switch 3 and/or terminal 1. In response to this capacity parameter (at the hand of said user identification and/or terminal identification and/or address code), processor 30 in switch 3 makes available a predefined bandwidth between terminal 1 and switch 3, and/or processor 10 in terminal 1 adjusts a predefined sampling rate and/or reserves a predefined amount of time and/or (de)activates noise reduction, for example. As a result, vocal commanding is offered and/or changed etc.

According to a first alternative to said fifth embodiment, for example in case of said application wanting to offer vocal commanding like command & control and/or dictation, said switch 3 and/or said terminal 1 respectively may decide that at the moment the necessary capacity is not available, in response to which said warning signal is to be sent to speech recognizer 2 and/or terminal 1 and switch 3 respectively etc.

According to a second alternative to said fourth embodiment, terminal 1 comprises a preprocessing unit (for example unit 13 or a part of processor 10) for preprocessing voice signals generated via mmi 11 (microphone), in which case in speech recognizer 2 a final processing function (for example unit 24) for final processing said preprocessed voice signal, in which case a distributed speech recognition system has been created.

According to a third alternative to said fourth embodiment, terminal 1 comprises a small vocal commanding unit like for example a simple name dialler (for example unit 13 or a part of processor 10), and at least a part of a dialogue takes place under control of and/or by using this small vocal commanding unit, etc.

All embodiments are just embodiments and do not exclude other embodiments not shown and/or described. All alternatives are just alternatives and do not exclude other alternatives not shown and/or described. Any (part of an) embodiment and/or any (part of an) alternative can be combined with any other (part of an) embodiment and/or any other (part of an) alternative.

Said terminal, base station and switch can be in accordance with GSM, UMTS, DECT, ISDN, PSTN etc. Said construction of said terminal, switch and speech recognizer con be amended without departing from the scope of this invention. Parallel blocks can be connected serially, and vice versa, and each bus can be replaced by separate connections, and vice versa. Said units and circuits, as well as all other blocks shown and/or not shown, can be 100% hardware, or 100% software, of a mixture of both. Each unit, circuit and block can be integrated with a processor or any other part, and each function of a processor can be realised by a separate unit, circuit or block. Any part of said speech recognizer can be shifted into said switch, and vice versa, and both can be completely integrated. Any connection can be circuit-switched all the time, packet-switched all the time, or circuit-switched during a first time-interval and packet-switched during a second time-interval.

Said adjustor can adjust a capacity parameter (direct adjustment) or command/request said memory to read out a certain capacity parameter (indirect adjustment via generation). In case said adjustor is located in said terminal, or said terminal is provided with a further adjustor, at least a part of the decision taking process is shifted into said terminal. In case said detector is located in said terminal and/or in said speech recognizer, or said terminal is provided with a further detector and/or said speech recognizer is provided with a yet further detector, at least a part of the detection process is shifted into said terminal and/or into said speech recognizer.

The invention claimed is:
1. A telecommunication system comprising:
   a network; and
   a terminal communicably linked to said network and generating an indication signal which indicates vocal commanding is to be performed, wherein said network comprises:
- a switch comprising a detector for detecting said indication signal generated by said terminal; and
- a speech recognizer for vocal commanding, said speech recognizer comprising an adjustor for adjusting a variable capacity parameter for said vocal commanding based on said indication signal detected by said detector.

2. A telecommunication system according to claim 1, wherein said adjustor further adjusts said capacity parameter based on a network signal generated by said network.

3. A telecommunication system according to claim 1, wherein said terminal comprises a preprocessing unit for preprocessing signals, and said speech recognizer comprising a final processing unit for final processing said preprocessed signals.

4. A telecommunications system according to claim 1, wherein said indication signal is generated by said terminal.

5. A telecommunication system according to claim 1, wherein said indication signal comprises a telephone number, a key signal or a vocal signal generated by a user of said terminal.

6. A telecommunication system according to claim 1, wherein said switch comprises a processor for generating an information signal in response to the indication signal detected by said detector, said adjustor adjusts said capacity parameter based on said information signal.

7. A telecommunication system according to claim 6, wherein said processor controls at least one of an available bandwidth, sampling rate, and noise reduction with regards communication with said terminal based on said capacity parameter.

8. A speech recognizer for use in a telecommunication system comprising a terminal coupled to a network comprising said speech recognizer for vocal commanding and a detector for detecting an indication signal generated by said terminal, said indication signal indicating said vocal commanding is to be performed, said speech recognizer comprising an adjustor adjusting a capacity parameter for said vocal commanding based on said indication signal detected by said detector.

9. A speech recognizer according to claim 8, wherein said adjustor further adjusts said capacity parameter based on a network signal generated by said network.

10. A speech recognizer according to claim 9, wherein said terminal comprises a preprocessing unit for preprocessing signals, and said speech recognizer further comprises a final processing unit for final processing said preprocessed signals.

11. A terminal for use in a telecommunication system comprising a network comprising a speech recognizer for vocal commanding, said terminal being coupled to said network and generating an indication signal which indicates said vocal commanding is to be performed, wherein said telecommunication system comprises a detector for detecting said indication signal and an adjustor adjusting a capacity parameter for said vocal commanding based on said indication signal.

12. Terminal according to claim 11, wherein said terminal comprises a man-machine-interface for receiving said indication signal.

13. Terminal according to claim 11, wherein said terminal comprises a preprocessing unit for preprocessing signal, with said network comprising a final processing unit for final processing said preprocessed signals.

14. Method for use in a telecommunication system comprising a terminal coupled to a network, said network comprising a speech recognizer for vocal commanding, said method comprising:
- generating at said terminal an indication signal which indicates said vocal commanding is to be performed;
- detecting at said network an indication signal; and
- adjusting at said network a capacity parameter for said vocal commanding based on said indication signal.

* * * * *